E. ROWART.
APPARATUS FOR THE MECHANICAL MANUFACTURE OF GLASS IN CONTINUOUS SHEETS.
APPLICATION FILED DEC. 15, 1908.
1,030,018.
Patented June 18, 1912.
4 SHEETS—SHEET 1.
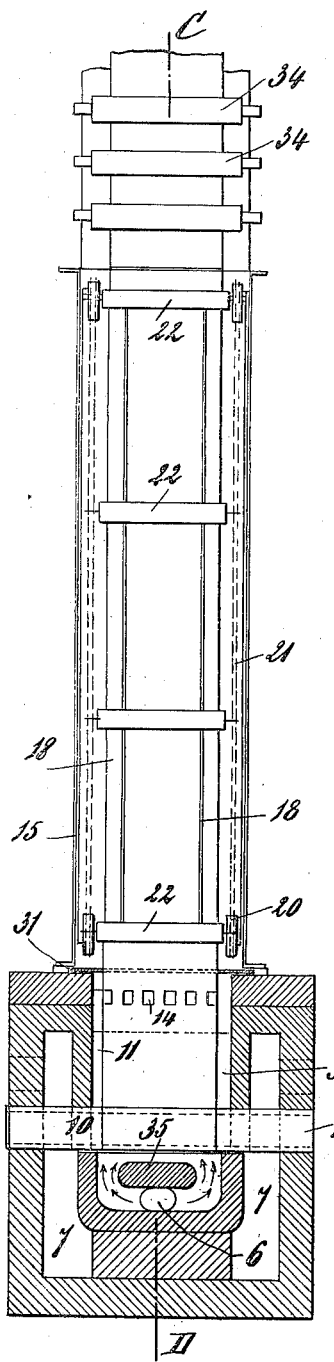
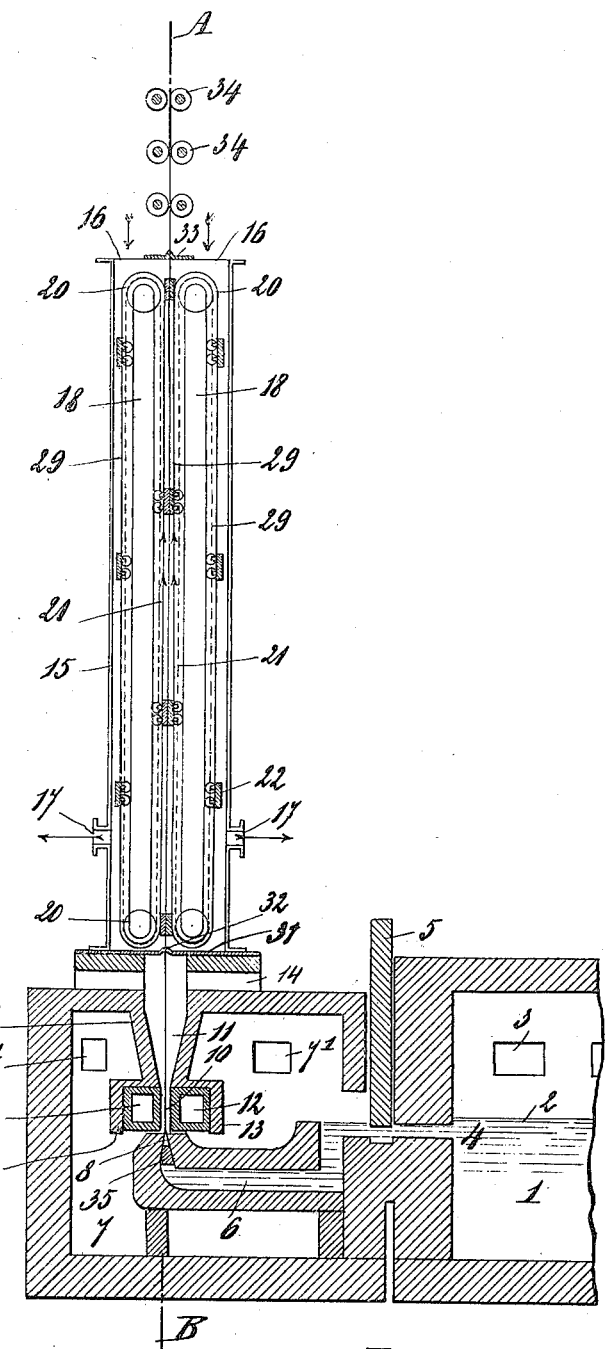
Witnesses:
Waldo M. Chapin
James D'Antonio
Inventor,
Eugène Rowart,
by Rosenbaum & Stockbridge
Attys

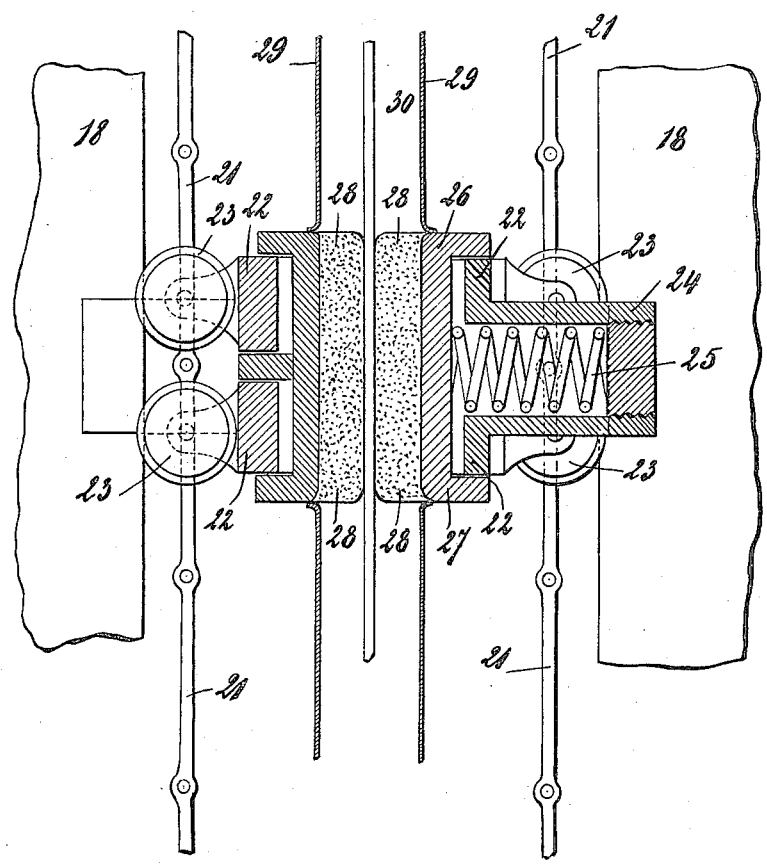

E. ROWART.
APPARATUS FOR THE MECHANICAL MANUFACTURE OF GLASS IN CONTINUOUS SHEETS.
APPLICATION FILED DEC. 15, 1908.
1,030,018.
Patented June 18, 1912.
4 SHEETS—SHEET 3.
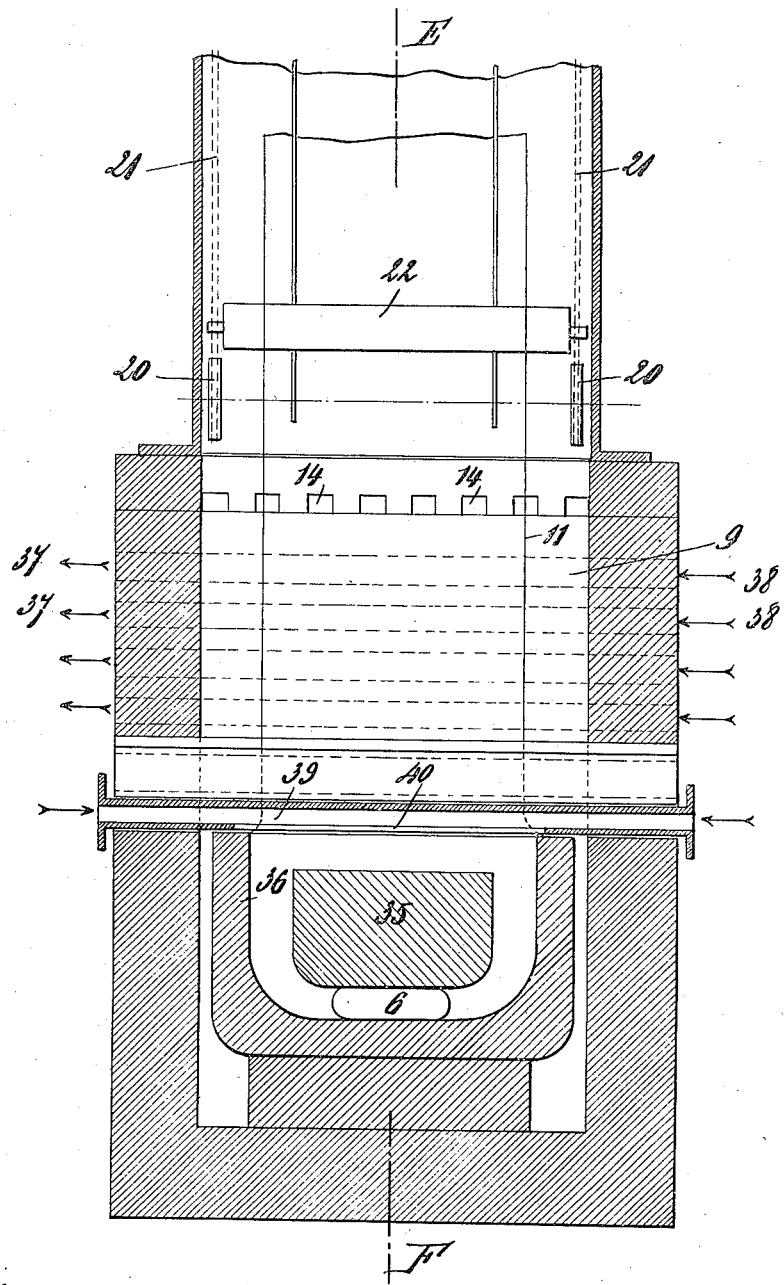

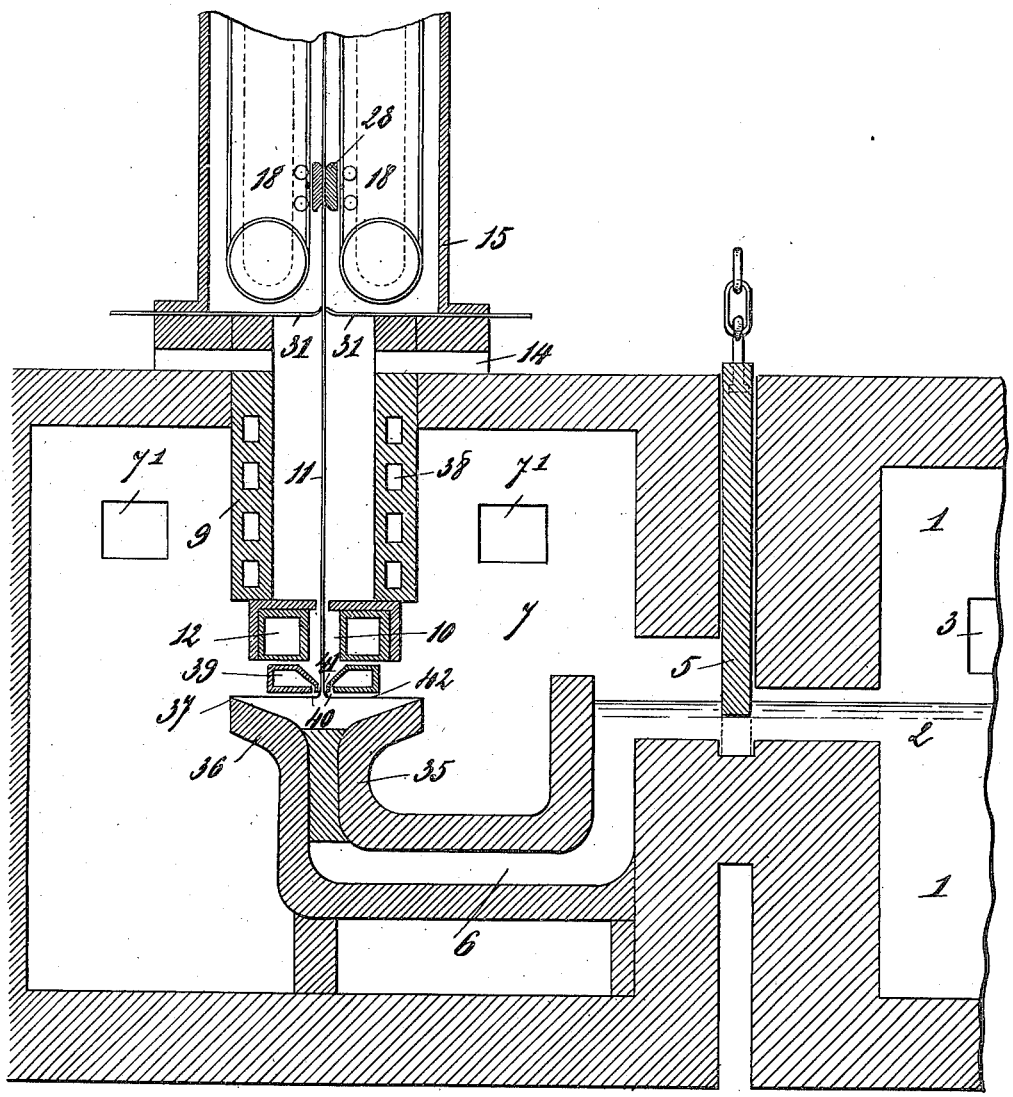

UNITED STATES PATENT OFFICE.

EUGÈNE ROWART, OF AUVELAIS, NEAR NAMUR, BELGIUM.

APPARATUS FOR THE MECHANICAL MANUFACTURE OF GLASS IN CONTINUOUS SHEETS.

1,030,018.

Specification of Letters Patent.  Patented June 18, 1912.

Application filed December 15, 1908. Serial No. 467,599.

*To all whom it may concern:*

Be it known that I, EUGÈNE ROWART, a subject of the King of Belgium, residing at Auvelais, near Namur, in the Kingdom of Belgium, have invented new and useful Improvements in Apparatus for the Mechanical Manufacture of Glass in Continuous Sheets, of which the following is a specification.

This invention is for the purpose of obviating the inconveniences found in the mechanical manufacture of glass in continuous sheets which inconveniences consist principally in the production of striation on the surface of the glass sheet, in the devitrification of the glass, in the adherence of the glass to the sides of the slit through which the glass is passed to form the sheet, and in the relatively considerable breakage which is produced during cooling and stretching of the sheets produced.

In order to obtain these ends the invention consists essentially in a system of feed of the molten glass by conduit into a chamber heated to a high temperature, in the distribution of the glass to the deliverer by two channels conducting the molten glass toward the two extremities of the deliverer, and in a special construction of deliverer of a particularly large surface, the edges of which are submitted to the action of radiation at a high temperature.

The invention also consists in the combination with the deliverer of a special device for the ejection of hot air or gas under pressure serving to fix the limits on the surface of the molten glass, of the base of the formation cone of the sheet of glass, and in the construction of a chamber for the formation of the sheet of glass which chamber is divided into two or several compartments in which the temperature can be regulated. This chamber is inclosed in an outer chamber heated to a constant temperature but able to be given a higher or a lower temperature according to the nature of the sheet of glass to be formed.

Two modifications of the invention are shown in the annexed drawings, in which—

Figure 1 is a vertical section on the line A—B of Fig. 2 of the forming chamber for the sheet of glass and the deliverer. Fig. 2 is a transversal section on C—D of Fig. 1 illustrating more particularly a part of the melting furnace, the heating chamber of the deliverer, the deliverer and the sheet formation chamber. Fig. 3 is a view on a larger scale of one of the devices employed for the transport of the sheet of glass in the cooling chamber forming a prolongation of the formation chamber. Fig. 4 is a vertical section of another construction of deliverer. Fig. 5 is a longitudinal vertical section on the line E—F of Fig. 4.

As is shown in Fig. 2 according to the invention the furnace 1 heated by burners 3 and containing the fused glass 2 communicates, by a channel 4 which can be more or less closed by a gate 5, with a conduit 6 arranged in a special chamber 7 heated by burners 7¹. This conduit 6 has at its forward end a slit 8 the width and length of which are in accordance with the thickness and size of the sheet of glass to be formed. The opening 8 of the conduit forming the deliverer proper is arranged at a level slightly lower than that of the glass in fusion in the furnace 1 so as to insure the issue of the glass by the slit 8 at a certain pressure. The extremity of the conduit provided with the slit 8 opens into the lower part of a chamber 9 housed in the interior of the heating chamber 7. This chamber 9 forms the formation chamber for the glass sheet. It can be of any suitable variable height and is divided as shown in Fig. 5 into two or more compartments allowing of exactly regulating the temperature at different points of its height. In the example shown the compartment 10 is formed by the space comprised between two steel tubes 12 of rectangular, square or other section and covered with a refractory substance 13 on the side exposed to the temperature of the heating chamber 7. The upper compartment 11 is formed by the sides of the chamber 9 and in order to allow of conveniently regulating the temperature in the compartment 11, said compartment can be put in communication with the atmosphere by openings 14 which can be regulated by registers or dampers. This arrangement is completed as will be described hereinafter by the addition of supplementary means to obtain a more complete regulation of the temperature in the upper compartment 11, so that the sheet in course of formation is subjected to the exact conditions required according to its thickness and the nature of the glass. For example, by means of the lower compartment 10, the sheet can be cooled when issuing from the deliverer by circulating cold air in the tubes 12. Then said sheet can be reheated by its passage through the chamber 11, and subsequently gradually cooled in the upper part of said chamber, if it is desired.

Above the chamber 9 and in the prolongation of the same is placed a cooling and stretching chamber 15 in which are conducting and stretching devices for the glass sheet. This chamber is provided at its upper part with an air entry port 16 and provided with regulating registers in its lower part, and with openings 17 provided with flap valves for the escape of the air circulating in the chamber. In the chamber 15 two sets of rails 18 are arranged vertically and opposite one another, said rails being carried by suitable cross members. The upper and lower cross members carry by suitable axles sprocket wheels 20 on which endless chains 21 travel, put in movement by suitable gearing. These chains carry cross pieces 22 at regular intervals provided with grooved rollers 23 running on the rails 18. The pieces 22 also carry along their length a certain number of boxes or sockets 24 each inclosing a spring 25 operating on a member 26 provided with borders 27 engaging over the edges of the cross pieces 22. The members 26 are provided on their faces with similar asbestos cushions 28 intended to operate on the glass plate passing between them. The spaces comprised between the different cushions 28 of successive cross members 26 is closed by sheets of asbestos fabric 29 so as to form a space or chamber 30 completely isolated in the central part of the chamber 15. As can be easily understood by the arrangement of the two sets of rails 18 on which the rollers 23 drawn by the chains 21 travel, the traveling device comprises a certain number of pairs of asbestos cushions which have a tendency to be pressed against one another by the action of the springs 25 acting against the ends of the sockets 24 and against the cross members 26 carrying the cushions 28. When the apparatus is in action each pair of cushions 28 forms a gripper which can travel from the bottom to the top in the central part of the chamber 15, the cushions of each pair separate from one another at the top of the chamber and then redescend along the sides of the chamber until after the passage of the chains over the lower sprocket wheels 20, they again meet and resume their ascending movement in the central part of the chamber 15. The asbestos sheets 29 travel with the cushions 28 and assure the formation in the central part of the chamber 15, of the space 30 completely shut off from the air current which circulates in the chamber 15, enters the said chamber by the regulatable openings 16 and escapes by the lower openings 17.

Communication between the chamber 15 and the chamber 9, which latter is partly inclosed in the heating chamber 7, is regulated by means of a sliding damper 31 the plates of which are provided on their adjacent edges with asbestos lips 32. This damper allows of regulating the introduction of the heat into the stretching chamber 15. The chamber 15 is provided at its upper part with an opening 33 which may be closed by a sliding damper similar to the damper 31 so as to allow the passage of the sheet of glass which is then seized by rollers 34 arranged in the known manner.

The apparatus operates as follows: The gate 5 being raised the molten glass flows from the furnace 1 through the channel 4 into the conduit 6. When the molten glass arrives in the branch of the conduit provided with the slit 8 it tends to remain on the lateral sides of the conduit; this would result in the formation at this point of glass in a more solidified state than in the central part of the slit of the conduit which would produce thicker edges, to prevent which the deliverer is provided centrally with a refractory piece 35 which is for the purpose of directing the flow of glass toward the two extremities and to conduct the fresh and hotter glass onto the sides of the deliverer in such a manner as to insure at this point the maintenance of the desired fluidity and temperature of the glass. To start the stretching of the glass a sheet of metal reinforced glass of the width of the sheet to be formed is placed between the cushions 28 at the upper part of the apparatus. This sheet is lowered in the apparatus so as to pass into the slit 8 where it is shortly fused to the molten glass. The upper part of the reinforced sheet is engaged between the cushion grippers 28 situated immediately above the chamber 9 and when the grippers are moved upward the reinforced sheet of glass is raised in the apparatus followed by a sheet of glass formed by the drawn glass as it leaves the slit 8. The speed which should be given to the grippers drawing the continuous sheet of glass depends on the temperature of the glass being drawn, on the thickness of the sheet in formation, on the temperature in the chamber 9 and on the height of this chamber.

As is shown in Fig. 2 the chamber 7 provided with burners $7^1$ uniformly heats the compartments 10 and 11 of the chamber 9 at a constant temperature. Consequently, the temperature of the compartments of the chamber 9 can be regulated according to the working conditions. For example for the production of thin sheets necessitating continuous cooling the temperature in the chamber 10 and also in chamber 11 can be regulated to produce gradual cooling of the glass. Or again, by suitable regulation of the circulation in the tubes 12 the glass can if necessary be cooled in the chamber 10 and re-heated in the chamber 11 without it being necessary to modify the temperature of the chamber 7. As the sheet of glass advances in the chamber 11 it is submitted to the exact degree of heat required. The amount of heat admitted into the chamber 15 from chamber 11 can be regulated by means of the registers 31. When the sheet of glass after having passed through the slit formed by the plates 31 passes into the chamber 15 it is seized by the grippers 28 which act with counter pressure on the surfaces of the sheet of glass. The sheet follows the movement of the grippers and rises in the chamber 15 at a speed which is regulated suitable to the working conditions; after rising for a certain height, a second pair of grippers seize the sheet of glass at the lower part of the apparatus and so on with regular intervals between the operations of the successive grippers. During its passage in the chamber 15 the sheet of glass is protected against the direct action of the air circulating in said chamber 15 by means of the asbestos sheets 29 which form the inclosed space 30 in the center of the chamber 15 in such a way that the cooling of the glass is effected in a rational and even manner.

The height of the chamber 9 and the number of compartments with which it is provided would vary in accordance with the thickness of the sheet of glass to be made.

The method of drawing up the sheet of glass allows of maintaining a great length of glass sheet with the light pressure of the grippers on the sheet in course of making. The sheet of glass is introduced into the chamber 15 at a relatively low temperature when the grippers do not produce any harmful action on the glass produced. When the sheet of glass, after being sufficiently cooled by its ascension in the chamber 15, leaves said chamber, by the opening 33 which is provided with a covering of a supple and non-heat conducting material in contact with the issuing glass and preventing the entrance of air, it is grasped by the rollers 34 or by a series of grippers similar to those previously described and after being raised for a certain height exposed to the free air it can be severed by means of a diamond or cutting wheel and then cut to size as required.

The essential features of the invention consist in the method of conducting the molten glass to the slit 8, the method of maintaining the glass at this place at a convenient state of fluidity and at a suitable temperature to prevent devitrification and the obstruction of the slit by deposits of glass, and the means for regulating the temperature during the first cooling of the produced sheet.

For manufacturing true surfaced looking glass which will not distort the objects reflected, the apparatus shown in Figs. 4 and 5 is used, in which the deliverer is modified so as to allow the fused glass to circulate more freely. In this construction the conduit 6 arranged in the heating chamber 7, is in communication with the furnace 1 by a channel 4 provided with a gate 5 as in the previously described construction. The conduit 6, instead of being provided with a simple outlet slit, is here provided at its upper part with a rectangular surface 36, the sides of which project with regard to the sides of the chamber 9. A certain quantity of glass in excess can be fed to the deliverer which can flow over the edges 37 and fall into the chamber 7 whence it can be removed and returned to the melting furnace. In this construction the chamber 9 is divided, as in the previously described construction, into two or more compartments 10 and 11, further the sides of the upper compartments, the compartment 11 for example, are provided with channels 38 for the exact regulation of the temperature of the chamber wherein the sheet of glass is formed. The lower compartment 11 of the chamber 9 is provided with two ejectors 39, constructed of steel for example and provided with openings 40 through which hot air or gas at a certain pressure can be ejected on to the surface of the deliverer. These ejectors are arranged at a certain distance from the surface level of the glass, as shown in Fig. 5, and their openings 40 are arranged in such a way as to form in the fused glass two parallel lines, determining in a clean manner, the base of the cone for the formation of the sheet of glass. The air from the ejectors 39 can escape either into the chamber 7 through the space 42 between the ejectors and the surface of the deliverer, or by the chamber 9 and the openings 14. In this construction as in that previously described, the sheet of glass as it is drawn upward in the chamber 15 is submitted to the requisite temperatures, varying according to its thickness, in the different compartments of the chamber 9.

The details of construction described can be modified without departing from the spirit of the invention.

Claims:

1. In combination a melting furnace, a heated chamber adjacent said furnace, a deliverer arranged in said chamber, a formation chamber partly inclosed in said heated chamber, circulation tubes arranged at the lower part of said formation chamber, circulation channels arranged in the walls of said formation chamber, means for bringing the upper part of the formation chamber into communication with the atmosphere, means for drawing up a glass-sheet leaving the deliverer after its passage through the formation chamber, and means for cooling the glass-sheet out of contact with the air.

2. In combination, a melting furnace, a heated chamber, adjacent this furnace, a deliverer placed in this heated chamber, a formation chamber partly inclosed in the heated chamber, means for varying the temperature in the formation chamber at different points of its height, means for transporting a glass-sheet, furnished by the deliverer and after its passage through the formation chamber, and a chamber isolated from the atmosphere for the regular cooling of the glass-sheet.

3. In combination, a melting furnace, a heated chamber adjacent this furnace, a deliverer arranged in this heated chamber, means for accelerating the circulation of the molten glass in the deliverer, a formation chamber partly inclosed in the heated chamber, means for varying at will the temperature at different points of the height of the formation chamber, forwarding mechanism for the glass-sheet furnished by the deliverer, after said sheet has traversed the formation chamber, and coöperating mechanism forming a central chimney isolated with regard to the atmosphere.

4. In combination, a melting furnace, a heated chamber adjacent said furnace, a deliverer arranged in this heated chamber, means for accelerating the circulation of the glass in the deliverer, and for deflecting of the glass to the lateral parts thereof, a formation chamber partly inclosed in the heated chamber, means for varying the temperature at different points of this chamber at will, forwarding mechanism for the glass-sheet coming from the deliverer and having traversed the formation chamber, and an isolated chimney, arranged in the prolongation of the axis of the formation chamber, and coöperating with the forwarding mechanism for raising the sheet and causing regular cooling of said sheet.

5. In combination, a melting furnace, a heated chamber adjacent this furnace, a deliverer arranged in this chamber, a conduit connecting the deliverer with the melting furnace, means for facilitating the formation of the glass-sheet at the surface of the deliverer, a formation chamber partly inclosed in the heated chamber, means for varying the temperature at different points of the height of this chamber, a transporting device placed above the formation chamber and in the axis of the latter, said transporting device comprising coöperating asbestos plates forming between themselves a chamber isolated from the atmosphere, and used for the cooling of the glass-sheet.

6. In combination, a melting furnace, a chamber adjacent thereto, a drawing pot arranged in said chamber, a conduit connecting said drawing pot to said furnace, a deliverer, means for forming depressions in the surface of fluid held therein, a formation chamber comprising superposed chimney like portions, means for successively treating the material passing therethrough to effect the production of such material in sheet form of predetermined thickness, and mechanism comprising gripping rollers for receiving said material after the same has passed through said formation chamber.

7. In glass making apparatus, a drawing pot, a deliverer therefor having a basin shaped cavity formed therein, means comprising gaseous jets for creating parallel depressions in the surface of the liquid mass held in said cavity, and means for drawing out a portion of said mass in sheet like form, in alinement with and between said depressions.

In testimony whereof I have signed my name to this specification in the presence of two subscribing witnesses.

EUGÈNE ROWART.

Witnesses:
  GEORGE BEDE,
  GREGORY PHELAN.